United States Patent [19]

Li

[11] Patent Number: 5,924,713

[45] Date of Patent: *Jul. 20, 1999

[54] AUXILIARY STEERING ASSEMBLY OF TRICYCLE

[76] Inventor: Hsing Li, 17 Yung Hsing Street, N. District, Taichung, Taiwan

[ * ] Notice: Under 35 U.S.C. 154(b), the term of this patent shall be extended for 00 days.

[21] Appl. No.: 08/857,326

[22] Filed: May 16, 1997

[51] Int. Cl.$^6$ ................................ B62B 3/12; B62K 9/02
[52] U.S. Cl. .................... 280/270; 280/282; 280/47.11
[58] Field of Search ............................... 280/47.11, 263, 280/270, 293, 282

[56] References Cited

U.S. PATENT DOCUMENTS

| | | | |
|---|---|---|---|
| D. 332,591 | 1/1993 | Reely | D12/129 |
| 3,485,507 | 12/1969 | Christof | 280/202 |
| 3,645,558 | 2/1972 | McMullen | 280/270 |
| 5,028,066 | 7/1991 | Garth | 280/282 |

*Primary Examiner*—Lanna Mai
*Assistant Examiner*—Avraham H. Lerner
*Attorney, Agent, or Firm*—Smith, Gambrell & Russell, LLP; Beveridge, DeGrandi, Weilacher & Young; Intellectual Property Group

[57] ABSTRACT

An auxiliary steering assembly of a tricycle is composed of two fastening pieces of the front steering handle, a fastening tube of the seat mount fastened with the body frame of the tricycle, and an auxiliary handlebar fastened at the bottom end thereof with the fastening tube of the seat mount. Two connection rods are fastened between the front steering handle and the auxiliary handlebar such that the connection rods can be manipulated by the auxiliary handlebar to control the steering of the front steering handle.

5 Claims, 5 Drawing Sheets

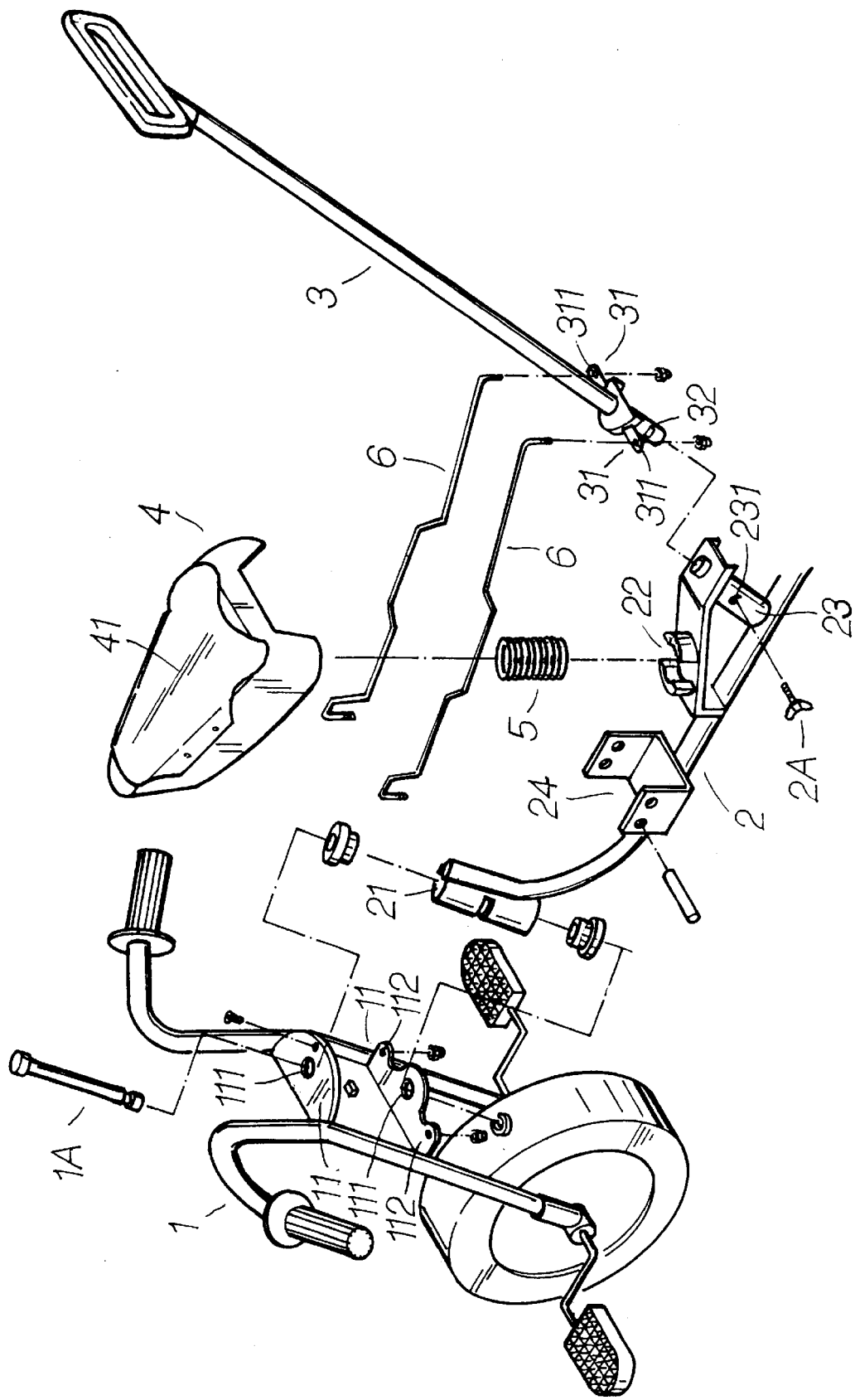
FIG. 1-A

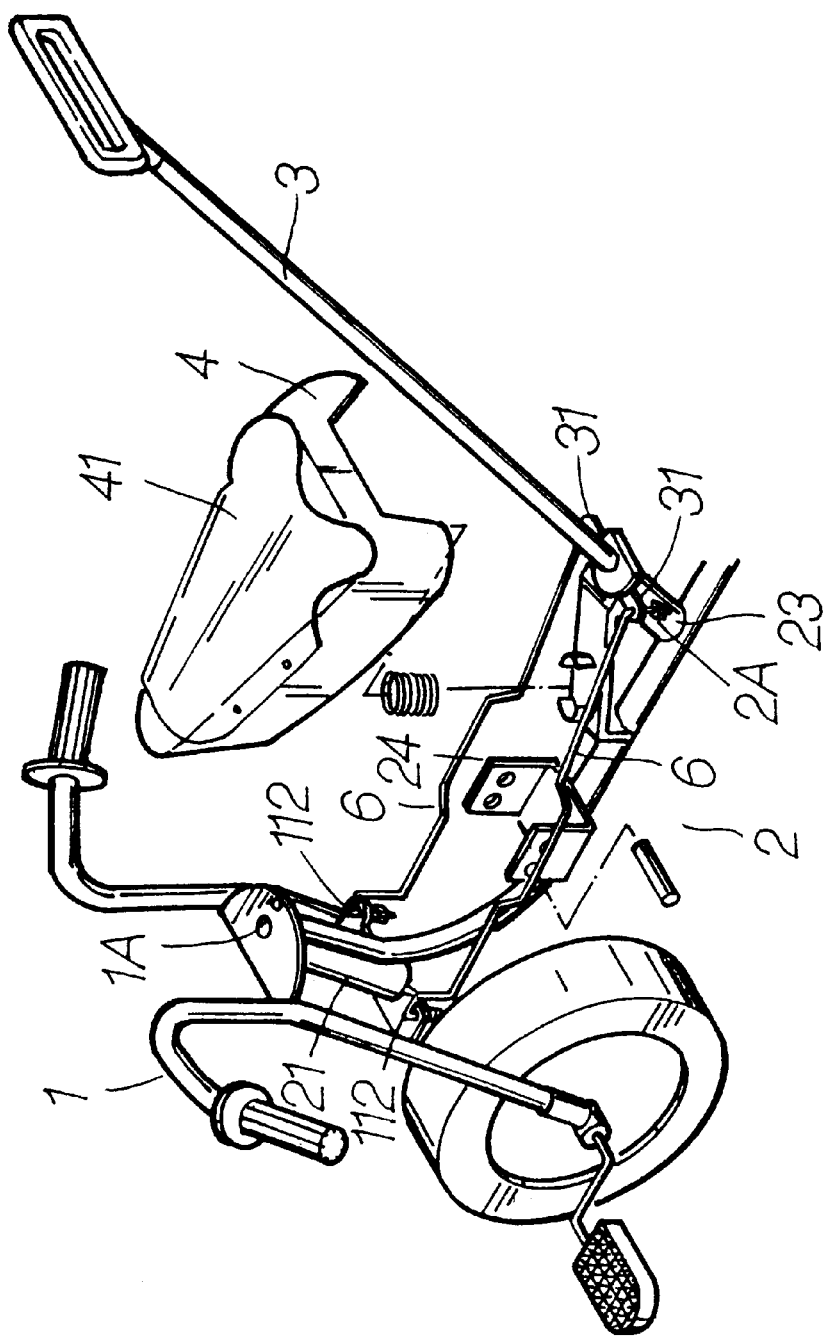
FIG. 1-B

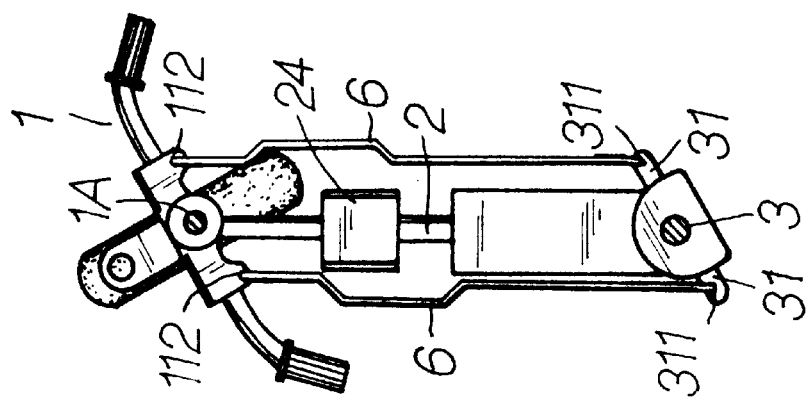
FIG. 3-B
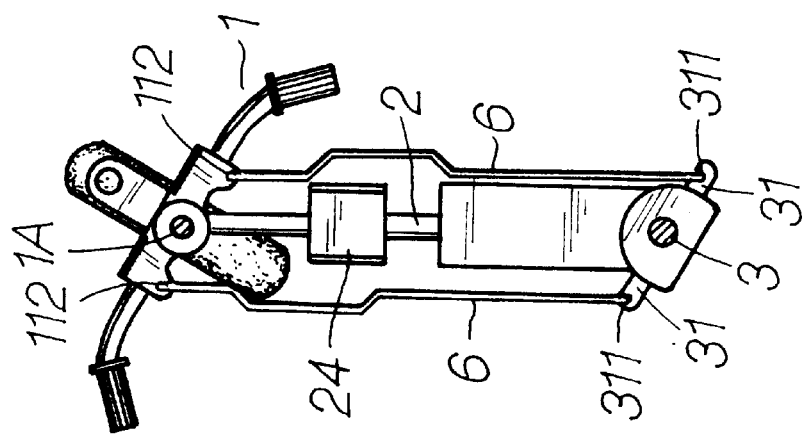
FIG. 3-C
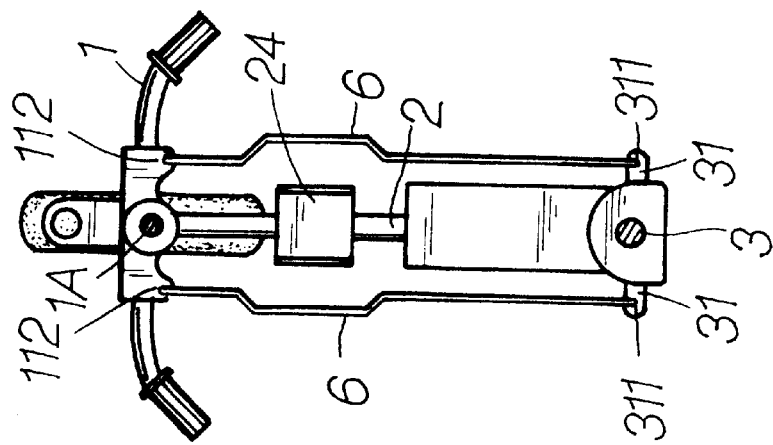
FIG. 3-A

AUXILIARY STEERING ASSEMBLY OF TRICYCLE

FIELD OF THE INVENTION

The present invention relates generally to a tricycle for children, and more particularly to an auxiliary steering assembly of the tricycle.

BACKGROUND OF THE INVENTION

As shown in FIG. 5, a prior art tricycle comprises two handlebars A1, a rear frame A2, and an intermediate frame A3 located between the handlebars A1 and the rear frame A2. The frames are fastened together by welding. The seat is fastened with a seat frame A4 which is engaged with the fastening seat A22 welded to a support tube A21 of the rear frame A2.

The prior art tricycle described above is intended for children, who are often unable to control the steering of the tricycle. For this reason, children must be taught by adults to control the operation of the handlebars. In the process of teaching children, the adults must hold the handlebars A1 from the behind to guide a child to steer the handlebars A1. Such a teaching process as described above is rather inconvenient as well as back-breaking as far as the adults are concerned. There must be a better way for an adult to engage in such teaching activities.

SUMMARY OF THE INVENTION

The primary objective of the present invention is therefore to provide a tricycle with an auxiliary steering assembly to facilitate the teaching of the steering control of the tricycle.

In keeping with the principle of the present invention, the foregoing objective of the present invention is attained by an auxiliary steering assembly, which consists of a rear handle fastened at the lower end thereof with two connection rods capable of being manipulated by the rear handle to control the steering of the handlebars of the tricycle.

The foregoing objective, features, functions and advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 1A shows an exploded view of the embodiment of the present invention.

FIG. 1B shows a partial schematic view of the present invention in combination.

FIG. 3A shows a schematic view of the present invention at work.

FIG. 3B shows another schematic view of the present invention at work.

DETAILED DESCRIPTION OF THE EMBODIMENT

Figure 5:
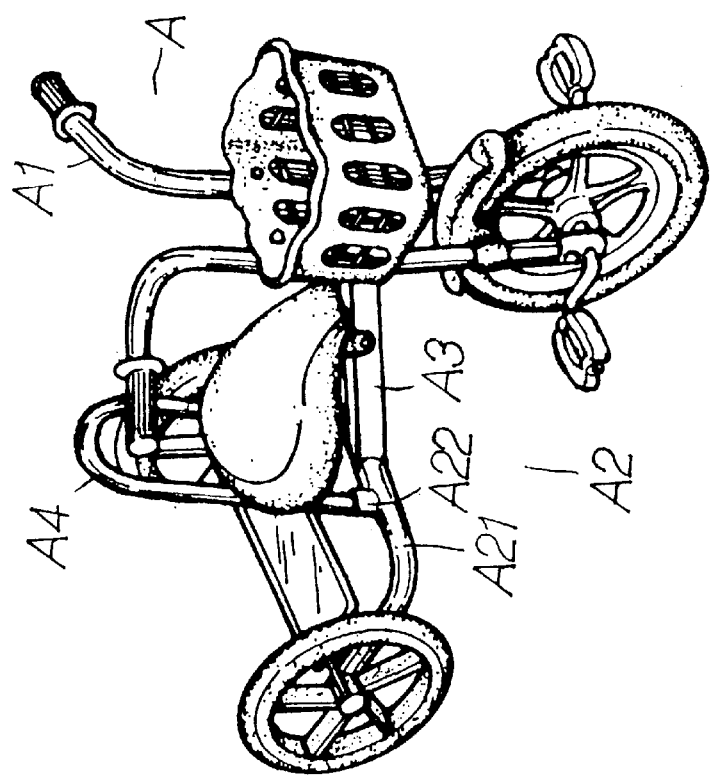
FIG. 5 shows a perspective view of a tricycle of the prior art.
Figure 2:
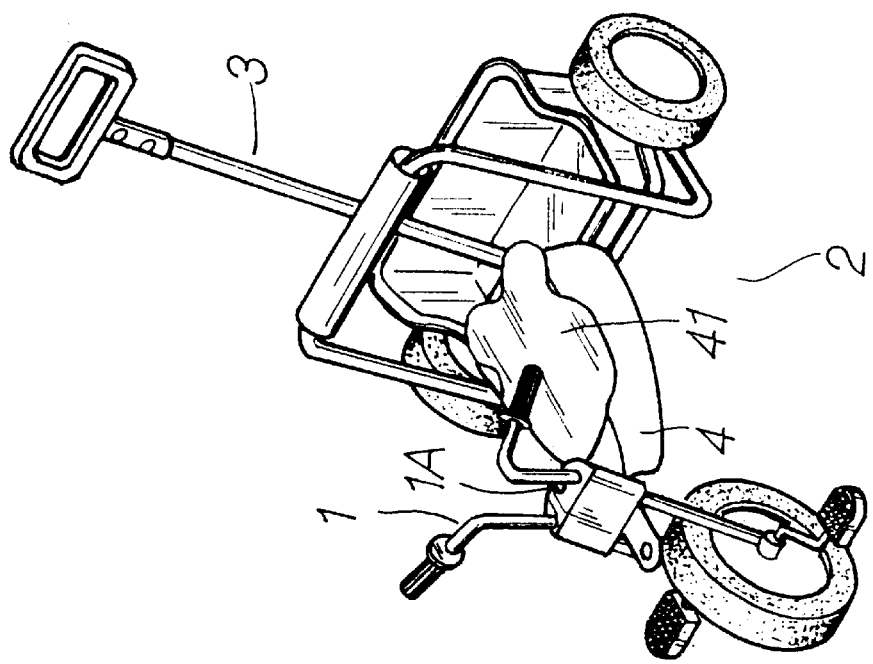
FIG. 2 shows a perspective view of the present invention in combination.
Figure 4:
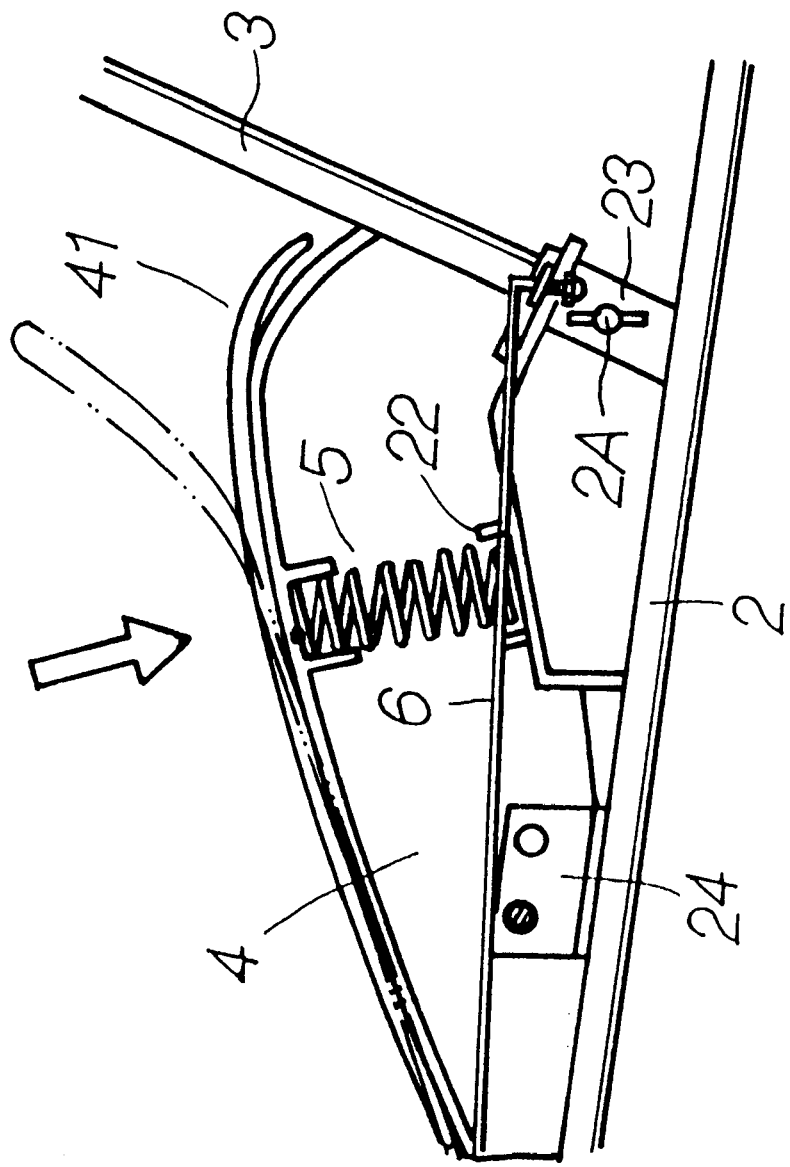
FIG. 4 shows a partial schematic view of the present invention.

As shown in FIGS. 1A, 1B, and 2, a tricycle embodied in the present invention is composed of a front handle 1, a body frame 2, and a rear (auxiliary) handlebar 3.

The front handle 1 is fastened with the front end of the body frame 2 by means of two fastening plates 11 which are provided with a fastening hole 111 engaging a fastening bolt 1A which is also engaged with a sleeve 21 of the body frame 2. The lower fastening plate 11 is provided with two connection holes 112. The fastening hole 111 is located between the two connection holes 112.

The body frame 2 comprises two seat mounts 22 and 24 on which a seat 4 is mounted. The rear seat mount 22 is provided with a fastening tube 23 of a hollow construction. The seat 4 is provided thereon with an inflatable seat pad 41 and is further provided thereunder with a coil spring 5 fastened therewith for absorbing shock. The fastening tube 23 has a threaded hole 231 traversing the midsegment of the fastening tube 23.

The auxiliary handlebar 3 is provided at the bottom end thereof with a connection piece 31 fastened therewith. The connection piece 31 is provided with a fastening portion 32 and two connection holes 311 opposite in location to each other. The auxiliary handlebar 3 is fastened with the fastening tube 23 of the body frame 2 such that the fastening portion 32 of the auxiliary handlebar 3 is received in the fastening tube 23, and that the fastening portion 32 is prevented from being turned excessively by a confining bolt 2A which is engaged with the threaded hole 231 of the fastening tube 23.

The auxiliary handlebar 3 is capable of manipulating the front handle 1 by means of two connection rods 6, which are engaged at both ends thereof with the two connection holes 112 of the lower fastening plate 11 and the two connection holes 311 of the connection piece 31.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. An auxiliary steering assembly of a tricycle, said auxiliary steering assembly comprising:

a body frame provided at a front end thereof with a fastening portion and at a rear end thereof with a seat mount having a fastening portion;

a front steering handle provided with an upper fastening piece and a lower fastening piece separated from said upper fastening piece by a predetermined distance permitting said fastening portion of said front end of said body frame to be fastened pivotally between said upper fastening piece and said lower fastening piece;

an auxiliary handlebar provided at a bottom end thereof with a connection portion which is engaged with said fastening portion of said seat mount of said body frame; and two connection rods fastened at both ends thereof with said connection portion of said auxiliary handlebar and said lower fastening piece of said front steering handle such that said two connection rods may be manipulated by said auxiliary handlebar to control the steering of said front steering handle.

2. The auxiliary steering assembly as defined in claim 1, wherein said upper fastening piece and said lower fastening piece of said front steering handle are provided with a pivoting hole; and wherein said fastening portion of said front end of said body frame is provided with a sleeve fastened therewith such that said sleeve is fastened pivotally with said front steering handle by a pivot which is engaged with said pivoting holes of said upper fastening piece and said lower fastening piece, and said sleeve.

3. The auxiliary steering assembly as defined in claim 1, wherein said fastening portion of said seat mount of said body frame is provided with a hollow fastening tube; wherein said connection portion of said auxiliary handlebar is provided with a fastening portion and two connection holes opposite in location to each other, said fastening portion of said auxiliary handlebar being engaged pivotally with said hollow fastening tube of said seat mount of said body frame; and wherein said lower fastening piece is provided with two connection holes which are engaged respectively with one end of said two connection rods each having another end engaged with one of said connection holes of said fastening portion of said auxiliary handlebar.

4. The auxiliary steering assembly as defined in claim 3, wherein said hollow fastening tube of said seat mount of said body frame is provided with a hole traversing said hollow fastening tube, and a confining bolt which is engaged with said hole for confining the rotational motion of said fastening portion of said auxiliary handlebar.

5. The auxiliary steering assembly as defined in claim 3, wherein said two connection rods have two hooked ends engegeable with said connection holes of said lower fastening piece of said front steering handle and said fastening portion of said auxiliary handlebar.

* * * * *